(12) United States Patent
Bertoti et al.

(10) Patent No.: US 10,874,886 B2
(45) Date of Patent: Dec. 29, 2020

(54) ENERGY ABSORBER COIL FOR SAFETY HARNESS

(71) Applicant: MSA Technology, LLC, Cranberry Township, PA (US)

(72) Inventors: Loryn Ashley Bertoti, Pittsburgh, PA (US); Carlos Alberto Sánchez Enriquez, San Juan del Río (MX); Michael James Kushner, Murrysville, PA (US); Luis Humberto Carmona Lopez, Corregidora (MX); Grant Monn Myers, Queretaro (MX); Daniel Aguilar Rojas, Queretaro (MX)

(73) Assignee: MSA Technology, LLC, Cranberry Township, PA (US)

( * ) Notice: Subject to any disclaimer, the term of this patent is extended or adjusted under 35 U.S.C. 154(b) by 165 days.

(21) Appl. No.: 16/046,420

(22) Filed: Jul. 26, 2018

(65) Prior Publication Data
US 2020/0030645 A1 Jan. 30, 2020

(51) Int. Cl.
*A62B 35/04* (2006.01)
*A62B 35/00* (2006.01)
*F16F 7/00* (2006.01)

(52) U.S. Cl.
CPC .......... *A62B 35/04* (2013.01); *A62B 35/0075* (2013.01); *F16F 7/006* (2013.01)

(58) Field of Classification Search
CPC ....... A62B 35/04; A62B 35/0075; F16F 7/006
USPC .................. 188/376, 371, 373; 66/192, 195; 182/3–8; 139/383 R, 384 R, 387 R, 397, 139/407, 409, 410, 426 R
See application file for complete search history.

(56) References Cited

U.S. PATENT DOCUMENTS

| 5,202,177 | A | * | 4/1993 | Kamper | A62B 35/04 139/384 R |
| 6,206,155 | B1 | | 3/2001 | Schneider | |
| 6,533,066 | B1 | * | 3/2003 | O'Dell | A62B 35/04 182/3 |
| 6,648,101 | B2 | * | 11/2003 | Kurtgis | A62B 35/0075 182/145 |
| 7,726,350 | B2 | | 6/2010 | Jennings et al. | |
| 7,815,013 | B2 | | 10/2010 | Griffith | |
| 8,356,691 | B2 | | 1/2013 | Griffith | |

(Continued)

FOREIGN PATENT DOCUMENTS

| CA | 2521389 A1 | 3/2007 |
| GB | 2283505 A | 5/1995 |

*Primary Examiner* — Pamela Rodriguez
(74) *Attorney, Agent, or Firm* — The Webb Law Firm (57) ABSTRACT

An energy absorber for a safety harness has a first end, a second end, and an energy absorbing portion between the first end and the second end. The energy absorbing portion has a first load-bearing web integrally bound to a second load-bearing web. The energy absorbing portion is coiled in a spiral shape in an undeployed configuration. The energy absorbing portion is deployable from the undeployed configuration to a deployed configuration when the first end is pulled away from the second end due to a force exceeding a minimum predetermined force threshold such that at least a portion of the first load-bearing web tears away from at least a portion of the second load-bearing web. The first load-bearing web and the second load-bearing web are integrally bound in the energy absorbing portion by a plurality of binder threads.

18 Claims, 7 Drawing Sheets

(56) References Cited

U.S. PATENT DOCUMENTS

| | | |
|---|---|---|
| 2009/0194366 A1 | 8/2009 | Parker et al. |
| 2010/0038925 A1 | 2/2010 | Conner |
| 2010/0236867 A1 | 9/2010 | Jones et al. |
| 2013/0292219 A1 | 11/2013 | Perner |
| 2018/0161607 A1* | 6/2018 | Jacob ................. A62B 35/0025 |

* cited by examiner

PRIOR ART

ENERGY ABSORBER COIL FOR SAFETY HARNESS

BACKGROUND OF THE INVENTION

Field of the Invention

The present invention relates generally to an energy absorber for use with a safety harness and, in particular, to an energy absorber coil for use with a safety harness.

Description of the Related Art

As is known in the art, there exist various attachable arrangements to provide assistance to a wearer or ensure the wearer's safety in certain situations. Such attachable arrangements come in many forms, including, but not limited to, harnesses and safety belts. Full body harnesses are widely used as a primary component in a personal fall arrest system. These harnesses can also be used for work positioning, travel restriction, ladder climbing, rescue retrieval, and evacuation. While these harnesses are used mainly in an industrial setting, and particularly the construction industry where the likelihood and danger of falls from heights is both numerous and significant, a full body harness can be used in various other applications in which total suspension and support of the body must be ensured, either expectedly or unexpectedly.

Full body harnesses, when used in a fall arrest situation, must always be used with an energy absorbing element. In some embodiments or aspects, the energy absorbing element may be an energy absorber. The energy absorber is attached at one end to an anchor point, such as by a lanyard, and at its other end to the harness worn by a user. The energy absorber is configured to activate during the fall to limit an impulse force on the user when the user's weight is fully borne by the harness.

In some embodiments, the energy absorber may use a tear-tape material which is configured to deploy or tear during a fall event. A conventional tear tape energy absorber requires two different pieces of textile material integrally bonded together prior to deployment. The first piece of material is the energy absorbing webbing, which deploys or tears during the fall event. The other piece of material is a stronger, thicker webbing that serves as a backup strap. The tear tape webbing is effective at reducing a force that is transmitted to the user during a fall event, but it is not intended to support the weight of the user after the fall event. Once the tear tape webbing is fully deployed, the backup strap is designed to support the weight of the user.

One disadvantage of conventional tear tape energy absorbers is that they can compromise the user's ability to move due to their size. The energy absorbing rating of conventional tear tape energy absorbers is primarily determined by the length of the tear tape webbing which can be deployed during the fall event. An increase in the energy absorbing rating results in a corresponding increase in the length of the energy absorber. Because the energy absorber is attached to the harness at the D-ring in an upper back portion of the harness, the energy absorber generally dangles from the back of the harness. The long overall length of conventional energy absorbers increases a possibility that the energy absorber may snag on an object in the user's work environment. Another disadvantage is that the tear tape webbing, once deployed, does not support the weight of the user. Thus, the backup strap must be made of a heavy-duty material that is capable of supporting the weight of the user after the fall event, thereby adding to the cost and weight of the conventional tear tape energy absorber.

Accordingly, there is a need in the art for an improved energy absorber that addresses certain drawbacks and deficiencies associated with prior art energy absorbers. For example, there is a need for an improved energy absorber that can be easily and effectively worn by the user in a variety of work environments without compromising the user's ability to move and without adding substantial weight that must be borne by the user. There is also a need for an improved energy absorber with increased safety compliance at the worksite, and with more effective and safe support of the user in the event of a fall.

SUMMARY OF THE INVENTION

Generally, provided is an improved energy absorber for use with a safety harness. Preferably, provided is an improved energy absorber that can be easily and effectively worn by the user in a variety of work environments without compromising the user's ability to move and without adding substantial weight that must be borne by the user. Preferably, provided is an improved energy absorber that leads to increased safety compliance at the worksite, and provides increased effectiveness to the fall protection arrangement and resulting safety of the user in the event of a fall.

In some non-limiting embodiments or aspects, an energy absorber for a safety harness may have a first end, a second end, and an energy absorbing portion between the first end and the second end. The energy absorbing portion may have a first load-bearing web integrally bound to a second load-bearing web. The energy absorbing portion may be coiled in a spiral shape in an undeployed configuration. The energy absorbing portion may be deployable from the undeployed configuration to a deployed configuration when the first end is pulled away from the second end due to a force exceeding a minimum predetermined force threshold such that at least a portion of the first load-bearing web tears away from at least a portion of the second load-bearing web. The first load-bearing web and the second load-bearing web may be integrally bound in the energy absorbing portion by a plurality of binder threads. The minimum predetermined force threshold may be in the range of about 900 lbs to about 1,200 lbs.

In other non-limiting embodiments or aspects, the energy absorbing portion may have a first starting tear point proximal to the first end, a second starting tear point proximal to the second end, and a reinforced area between the first starting tear point and the second starting tear point. During deployment, the first load-bearing web may successively tear away from the second load-bearing web in a direction from the first starting tear point toward the reinforced area and in a direction from the second starting tear point toward the reinforced area. The reinforced area may prevent separation of the first load-bearing web from the second load-bearing web. The first load-bearing web may have a first left end and a first right end, and the first left end and the first right end may be joined together to define the first end of the energy absorber. The first left end and the first right end may form a first loop. The second load-bearing web may have a second left end and a second right end, and the second left end and the second right end may be joined together to define the second end of the energy absorber. The second left end and the second right end may form a second loop.

In other non-limiting embodiments or aspects, a casing may at least partially envelop the energy absorbing portion. The casing may have a first opening through which the first load-bearing web extends out of the casing and a second opening through which the second load-bearing web extends out of the casing. A first attaching structure may be connected to the first end. The first attaching structure may be a D-ring, carabiner, or a snap hook. A second attaching structure may be connected to the second end. The second attaching structure may be a D-ring, carabiner, or a snap hook.

In other non-limiting embodiments or aspects, an energy absorber for a safety harness, the energy absorber may have a first end, a second end, and an energy absorbing portion between the first end and the second end. A casing may at least partially envelop the energy absorbing portion. The energy absorbing portion may have a first load-bearing web integrally bound to a second load-bearing web by a plurality of binder threads. The first load-bearing web may have a first left end and a first right end, and the first left end and the first right end are joined together to define the first end of the energy absorber. The second load-bearing web may have a second left end and a second right end, and the second left end and the second right end are joined together to define the second end of the energy absorber. The energy absorbing portion may be coiled in a spiral shape in an undeployed configuration. the energy absorbing portion may be deployable from the undeployed configuration to a deployed configuration when the first end is pulled away from the second end due to a force exceeding a minimum predetermined force threshold such that at least a portion of the first load-bearing web tears away from at least a portion of the second load-bearing web.

In other non-limiting embodiments or aspects, the casing may have a first opening through which the first load-bearing web extends out of the casing and a second opening through which the second load-bearing web extends out of the casing. The energy absorbing portion may have a first starting tear point proximal to the first end, a second starting tear point proximal to the second end, and a reinforced area between the first starting tear point and the second starting tear point. During deployment, the first load-bearing web may successively tear away from the second load-bearing web in a direction from the first starting tear point toward the reinforced area and in a direction from the second starting tear point toward the reinforced area.

Further non-limiting embodiments or aspects will now be set forth in the following numbered clauses.

Clause 1: An energy absorber for a safety harness, the energy absorber comprising: a first end, a second end, and an energy absorbing portion between the first end and the second end, wherein the energy absorbing portion has a first load-bearing web integrally bound to a second load-bearing web, wherein the energy absorbing portion is coiled in a spiral shape in an undeployed configuration, and wherein the energy absorbing portion is deployable from the undeployed configuration to a deployed configuration when the first end is pulled away from the second end due to a force exceeding a minimum predetermined force threshold such that at least a portion of the first load-bearing web tears away from at least a portion of the second load-bearing web.

Clause 2: The energy absorber of clause 1, wherein the first load-bearing web and the second load-bearing web are integrally bound in the energy absorbing portion by a plurality of binder threads.

Clause 3: The energy absorber of clause 1 or clause 2, wherein the minimum predetermined force threshold is in the range of about 900 lbs to about 1,200 lbs.

Clause 4: The energy absorber of any of clauses 1-3, wherein the energy absorbing portion has a first starting tear point proximal to the first end, a second starting tear point proximal to the second end, and a reinforced area between the first starting tear point and the second starting tear point.

Clause 5: The energy absorber of any of clauses 1-4, wherein, during deployment, the first load-bearing web successively tears away from the second load-bearing web in a direction from the first starting tear point toward the reinforced area and in a direction from the second starting tear point toward the reinforced area.

Clause 6: The energy absorber of any of clauses 1-5, wherein the reinforced area prevents separation of the first load-bearing web from the second load-bearing web.

Clause 7: The energy absorber of any of clauses 1-6, wherein the first load-bearing web has a first left end and a first right end, and wherein the first left end and the first right end are joined together to define the first end of the energy absorber.

Clause 8: The energy absorber of any of clauses 1-7, wherein the first left end and the first right end form a first loop.

Clause 9: The energy absorber of any of clauses 1-8, wherein the second load-bearing web has a second left end and a second right end, and wherein the second left end and the second right end are joined together to define the second end of the energy absorber.

Clause 10: The energy absorber of any of clauses 1-9, wherein the second left end and the second right end form a second loop.

Clause 11: The energy absorber of any of clauses 1-10, further comprising a casing at least partially enveloping the energy absorbing portion.

Clause 12: The energy absorber of any of clauses 1-11, wherein the casing comprises a first opening through which the first load-bearing web extends out of the casing and a second opening through which the second load-bearing web extends out of the casing.

Clause 13: The energy absorber of any of clauses 1-12, further comprising a first attaching structure connected to the first end.

Clause 14: The energy absorber of any of clauses 1-13, wherein the first attaching structure is a D-ring, a carabiner, or a snap hook.

Clause 15: The energy absorber of any of clauses 1-14, further comprising a second attaching structure connected to the second end.

Clause 16: The energy absorber of any of clauses 1-16, wherein the second attaching structure is a D-ring, a carabiner, or a snap hook.

Clause 17: An energy absorber for a safety harness, the energy absorber comprising: a first end, a second end, and an energy absorbing portion between the first end and the second end; and a casing at least partially enveloping the energy absorbing portion, wherein the energy absorbing portion has a first load-bearing web integrally bound to a second load-bearing web by a plurality of binder threads, wherein the first load-bearing web has a first left end and a first right end, and wherein the first left end and the first right end are joined together to define the first end of the energy absorber, and wherein the second load-bearing web has a second left end and a second right end, and wherein the second left end and the second right end are joined together to define the second end of the energy absorber, wherein the energy absorbing portion is coiled in a spiral shape in an undeployed configuration, and wherein the energy absorbing portion is deployable from the undeployed configuration to a deployed configuration when the first end is pulled away from the second end due to a force exceeding a minimum predetermined force threshold such that at least a portion of the first load-bearing web tears away from at least a portion of the second load-bearing web.

Clause 18: The energy absorber of clause 17, wherein the casing comprises a first opening through which the first load-bearing web extends out of the casing and a second opening through which the second load-bearing web extends out of the casing.

Clause 19: The energy absorber of clause 17 or clause 18, wherein the energy absorbing portion has a first starting tear point proximal to the first end, a second starting tear point proximal to the second end, and a reinforced area between the first starting tear point and the second starting tear point.

Clause 20: The energy absorber of any of clauses 17-19, wherein, during deployment, the first load-bearing web successively tears away from the second load-bearing web in a direction from the first starting tear point toward the reinforced area and in a direction from the second starting tear point toward the reinforced area.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

In FIGS. 1-5B, like characters refer to the same components and elements, as the case may be, unless otherwise stated.

DETAILED DESCRIPTION OF THE PREFERRED EMBODIMENTS

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "load-bearing", when used in reference to at least one web of an energy absorber, means that a web has sufficient strength properties to support a weight of a user when an energy absorber is fully deployed.

As used herein, the terms "coil", "coiled", and "coiled in a spiral shape", when used in reference to a shape of an energy absorber, means that at least a portion of an energy absorber is wound in a continuous and gradually widening curve about a central axis.

Figure 1A:
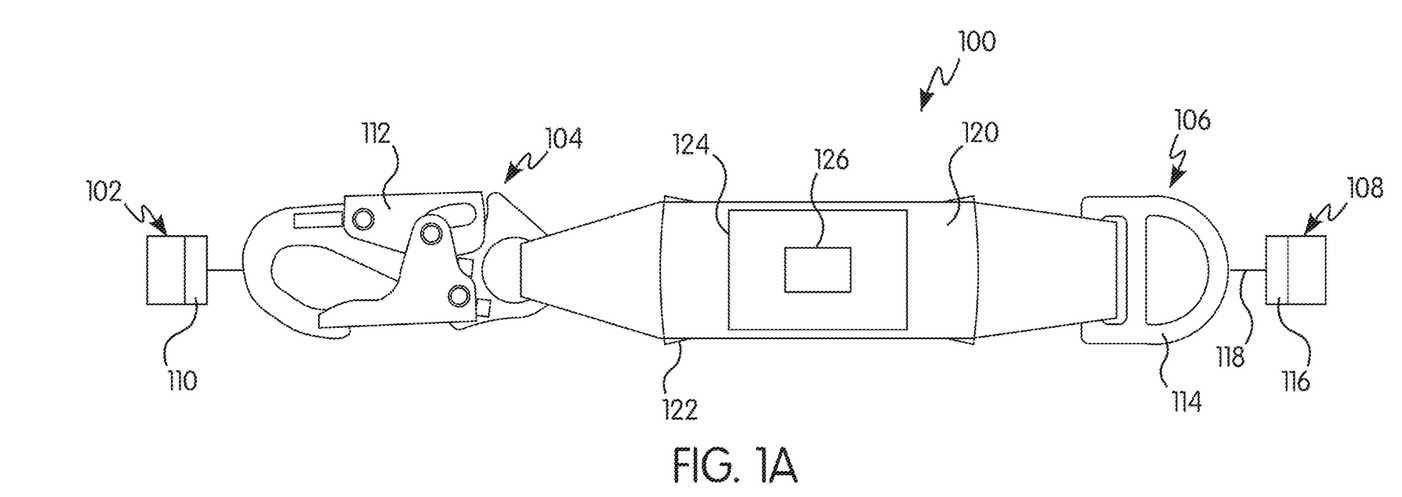
FIG. 1A is a side view of an energy absorber for use with a safety harness in accordance with the principles of the present invention.
Figure 1B:
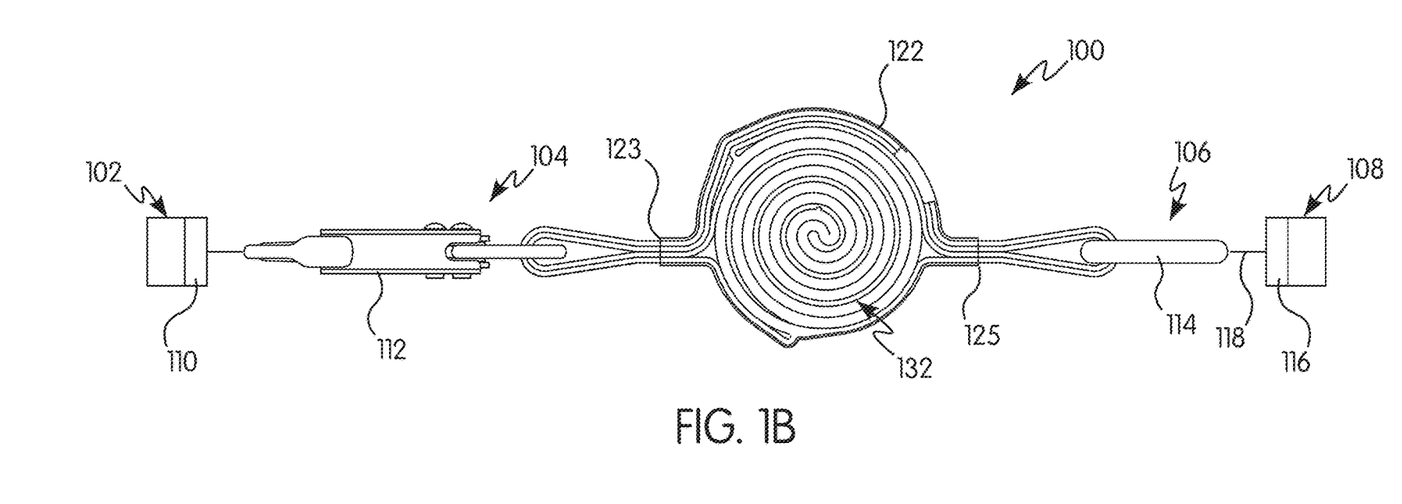
FIG. 1B is a top view of the energy absorber shown in FIG. 1A.

Referring initially to FIGS. 1A-1B, an energy absorber 100 for use with a safety harness 102 is shown in accordance with one non-limiting embodiment or aspect. The safety harness 102 may be any type of a safety harness used in fall protection applications where the safety harness 102 is configured for suspending the weight of the user. In some non-limiting embodiments or aspects, the safety harness 102 may be a full-body harness configured for use in a construction and/or maintenance environment, such as on an elevated structure. In other non-limiting embodiments or aspects, the safety harness 102 may be any type of harness configured for protecting the user in an environment where there is a risk of falling from an elevated position.

With continued reference to FIGS. 1A-1B, the energy absorber 100 has a first end 104 configured for connecting to the safety harness 102 and a second end 106 configured for connecting to an anchoring structure 108. In some non-limiting embodiments or aspects, the first end 104 of the energy absorber 100 may be removably connected to at least a portion of the safety harness 102, such as the D-ring 110 of the safety harness 102. For example, the first end 104 may have a first attaching structure 112, such as a carabiner or a snap hook that is removably connectable to the D-ring 110 of the safety harness 102. In some examples, the first attaching structure 112 may be a D-ring configured for connecting to a carabiner or a snap hook on the harness. In other non-limiting embodiments or aspects, the first end 104 of the energy absorber 100 may be non-removably connected to at least a portion of the safety harness 102, such as by being directly integrated with the safety harness 102. For example, the first end 104 may be directly and non-removably integrated with the D-ring 110 of the safety harness 102, with or without the first attaching structure 112. One or more intermediate structures, such as lanyards, may connect the first end 104 of the energy absorber 100 to the safety harness 102.

With continued reference to FIGS. 1A-1B, the second end 106 of the energy absorber 100 may be removably connected to the anchoring structure 108, such as a railing. For example, the second end 106 may have a second attaching structure 114, such as a D-ring, a carabiner, or a snap hook that is removably connectable to a connecting element 116 on the anchoring structure 108, such as a corresponding D-ring, a carabiner, or a snap hook. In other non-limiting embodiments or aspects, the second end 106 of the energy absorber 100 may be non-removably connected to the anchoring structure 108, such as by being directly integrated with the anchoring structure 108. For example, the second end 106 may be directly and non-removably integrated with the connecting element 116 on the anchoring structure 108. One or more intermediate structures 118, such as lanyards, may connect the second end 106 of the energy absorber 100 to the anchoring structure 108.

With continued reference to FIGS. 1A-1B, the energy absorber 100 has a body 120 between the first end 104 and the second end 106. The body 120 defines an energy absorbing portion of the energy absorber 100. In some non-limiting embodiments or aspects, the body 120 is at least partially enveloped in a casing 122. The casing 122 may have a first opening 123 through which the first end 104 of the energy absorber 100 extends out of the casing 122, and a second opening 125 through which the second end 106 of the energy absorber 100 extends out of the casing 122. The casing 122 may be shaped to correspond to the shape of the body 120 of the energy absorber 100. In some non-limiting embodiments or aspects, the casing 122 has a substantially cylindrical profile with a substantially circular cross section. The casing 122 may be made from a plastic material. Optionally, the plastic material of the casing 122 may be shrink wrapped around the body 120, such as due to heat shrinking properties of the plastic material from which the casing 122 is made. In some non-limiting embodiments or aspects, the casing 122 may be breakable with activation of the energy absorber 100. For example, the casing 122 may be configured to break or fracture to allow the unrolling of the coiled energy absorber 100 from the casing 122.

The casing 122 may be opaque, translucent, or transparent such that the body 120 is visible through the casing 122. An identification tag 124 may be applied to at least a portion of the casing 122, such as an outside portion of the casing 122. The identification tag 124 provides identifying information 126 about the energy absorber 100, such as the manufacturer, model number, manufacture date, manufacture lot, load rating, and other identifying information.

Figure 4:
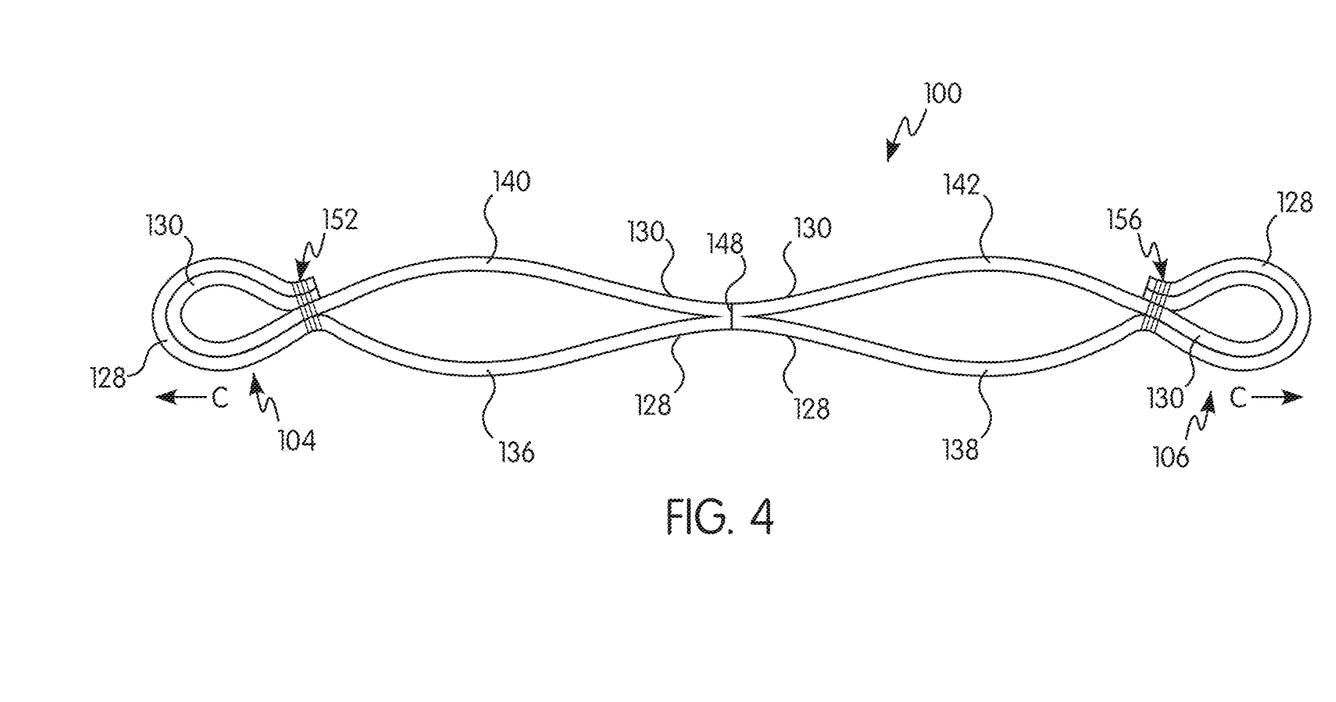
FIG. 4 is side view of the energy absorber of FIG. 1A shown in an unrolled and deployed configuration.

With particular reference to FIG. 1B, the body 120 of the energy absorber 100 is configured to deploy from an undeployed configuration to a deployed configuration (shown in FIG. 4) when the energy absorber 100 is exposed to a force in excess of a predetermined force threshold, as discussed herein. In the undeployed configuration, at least a portion of the body 120 of the energy absorber 100 may be coiled into a spiral form such that at least a portion of the body 120 is wound in a continuous and gradually widening curve about a central axis. As described herein, as the energy absorber 100 deploys, such as during a fall event where a force on the energy absorber 100 exceeds a predetermined force threshold, the body 120 is unrolled into the deployed configuration, as shown in FIG. 4.

Figure 2A:
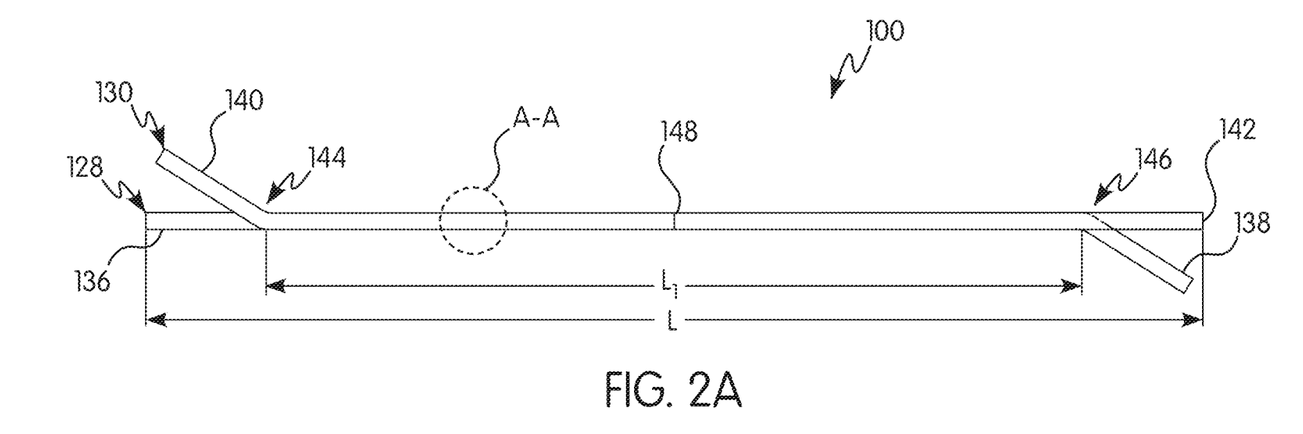
FIG. 2A is a top view of an energy absorbing element for use with the energy absorber shown in FIG. 1A.
Figure 2B:
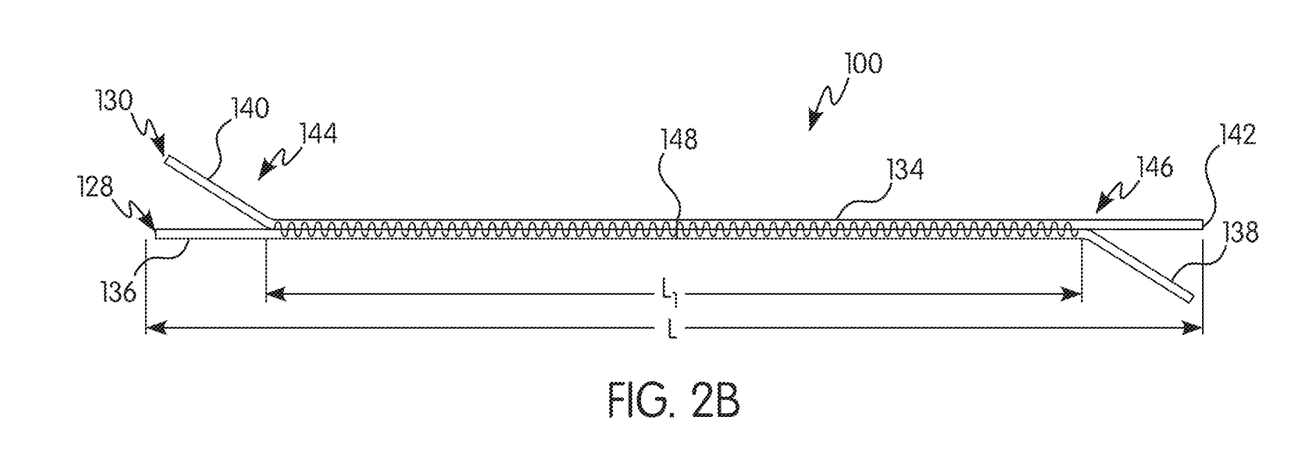
FIG. 2B is a side view of the energy absorbing element shown in FIG. 2A.

With reference to FIGS. 2A-2B, the energy absorber 100 has a first load-bearing web 128 that is integrally bound to a second load-bearing web 130 in an energy absorbing portion 132 extending along at least a portion of the major longitudinal length of the first load-bearing web 128 and the second load-bearing web 130. In some non-limiting embodiments or aspects, the first load-bearing web 128 and the second load-bearing web 130 may have the same length, width, and thickness. In other non-limiting embodiments or aspects, the first load-bearing web 128 and the second load-bearing web 130 may have a different length, width, and/or thickness. The energy absorbing portion 132 extends over a length L1, which is less than an overall length L of the energy absorber 100. In some non-limiting embodiments or aspects, length L1 of the energy absorbing portion 132 may be about 60% to about 90% of the overall length L of the energy absorber 100.

The first load-bearing web 128 and the second load-bearing web 130 can be made of any material suitable in fall protection applications. For example, the first load-bearing web 128 and the second load-bearing web 130 can be made of synthetic materials, such as synthetic yarns woven to form the first load-bearing web 128 and the second load-bearing web 130. In some examples, the first load-bearing web 128 and the second load-bearing web 130 could include elongation members, such as POY (partially oriented yarns).

With reference to FIGS. 2A-2B, in some non-limiting embodiments or aspects, the first load-bearing web 128 and the second load-bearing web 130 are integrally bound together in the energy absorbing portion 132 by binder threads 134 (shown in FIG. 2B) such that the first load-bearing web 128 and the second load-bearing web 130 constitute a single piece of webbing material over the length of the energy absorbing portion 132. While the present disclosure describes the binder threads 134 as a means of integrally bonding the first load-bearing web 128 and the second load-bearing web 130, other suitable bonding means, such as hook-and-loop fasteners, adhesives, or other energy absorbing materials may also be used, either individually or in combination with the binder threads 134. As described herein, the first load-bearing web 128 and the second load-bearing web 130 are configured to separate from each other at the energy absorbing portion 132 due to tearing of the binder threads 134 when a sufficient force in excess of a predetermined force threshold is applied to the energy absorber 100.

With continued reference to FIGS. 2A-2B, the first load-bearing web 128 has a first left end 136 and a first right end 138. Similarly, the second load-bearing web 130 has a second left end 140 and a second right end 142. The first load-bearing web 128 and the second load-bearing web 130 are aligned such that the first left end 136 of the first load-bearing web 128 and the second left end 140 of the second load-bearing web 130 overlap each other, and such that the first right end 138 of the first load-bearing web 128 and the second right end 142 of the second load-bearing web 130 overlap each other. The first and second left ends 136, 140 and the first and second right ends 138, 142 are separated from each other such that the first load-bearing web 128 and the second load-bearing web 130 are connected only in the area of the energy absorbing portion 132. The first load-bearing web 128 and the second load-bearing web 130 are integrally bound together in the energy absorbing portion 132 that is intermediate between the first left and right ends 136, 138 of the first load-bearing web 128 and the second left and right ends 140, 142 of the second load-bearing web 130.

With particular reference to FIG. 2B, the energy absorbing area 132 has a first starting tear point 144 at which the first load-bearing web 128 and the second load-bearing web 130 are not bound together by the binder threads 134. The first starting tear point 144 is positioned at a junction of the first left end 136 of the first load-bearing web 128 and the second left end 140 of the second load-bearing web 130. The energy absorbing area 132 also has a second starting tear point 146 at which the first load-bearing web 128 and the second load-bearing web 130 are not bound together by the binder threads 134. The second starting tear point 146 is positioned at a junction of the first right end 138 of the first load-bearing web 128 and the second right end 142 of the second load-bearing web 130. The first load-bearing web 128 and the second load-bearing web 130 are integrally bound together between the first starting tear point 144 and the second tearing start point 146. During a fall event when the force on the energy absorber 100 exceeds a minimum predetermined force threshold, the binder threads 134 start to fracture (or tear) at the first starting tear point 144 and the second starting tear point 146, and continue tearing along the longitudinal length of an energy absorbing area 132 in a direction of arrows A in FIG. 2B. In other words, fracture of the binder threads 134 may start at opposite ends of the energy absorbing portion 132 at the first and second starting tear points 144, 146, and continue from these opposite ends toward a center of the energy absorbing portion 132.

With continued reference to FIG. 2B, the energy absorbing portion 132 has a reinforced area 148 between the first and second starting tear points 144, 146 defining an ending tear point. The first load-bearing web 128 and the second load-bearing web 130 are permanently and non-removably connected at the reinforced area 148, such as by non-tearable stitching, to prevent further tearing of the first load-bearing web 128 from the second load-bearing web 130 once all of the binder threads 134 between the first and second starting tear points 144, 146 and the reinforced area 148 have been fractured or torn. The tearing of the binder threads 134 in the energy absorbing portion 132 in a direction from the first and second starting tear points 144, 146 toward the reinforced area 148 may end prior to the reinforced area 148 if the force on the energy absorber 100 is below the minimum predetermined force necessary to tear the binder threads 134.

Figure 2C:
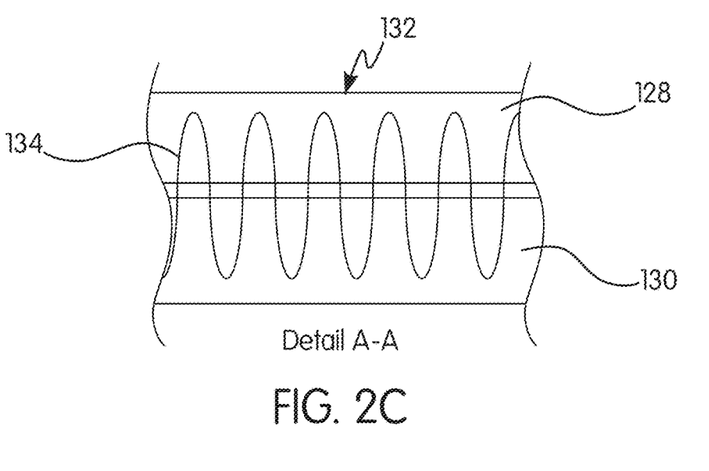
FIG. 2C is side view of detail A-A shown in FIG. 2A, with the webbing shown in an undeployed configuration.
Figure 2D:
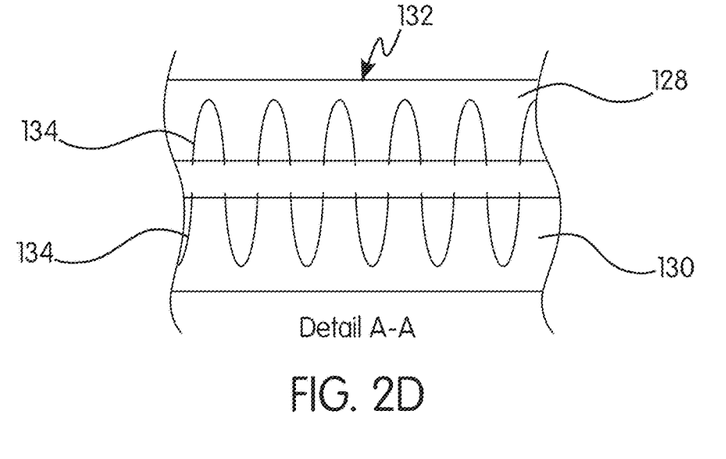
FIG. 2D is side view of detail A-A shown in FIG. 2A, with the webbing shown in a deployed configuration.

With reference to FIGS. 2C-2D, the binder threads 134 extend through at least a portion of a thickness of the first load-bearing web 128 and the second load-bearing web 130. In some embodiments or aspects, the binder threads 134 extend though the entire thickness of each of the first load-bearing web 128 and the second load-bearing web 130. The binder threads 134 may be woven in two or more rows extending along a longitudinal length of the first load-bearing web 128 and the second load-bearing web 130. In various non-limiting embodiments or aspects, the rows may be substantially parallel to each other, or intersect at least once with each other along the longitudinal length of the first load-bearing web 128 and the second load-bearing web 130. In other non-limiting embodiments or aspects, the binder threads 134 may be arranged in a plurality of thread groups arranged in a pattern. The density of thread groups may be constant along the longitudinal length of the first load-bearing web 128 and the second load-bearing web 130. In this manner, the first load-bearing web 128 and the second load-bearing web 130 will separate from one another due to breaking of the binder threads 134 at a constant rate at a given force that exceeds the minimum predetermined force threshold. In other non-limiting embodiments or aspects, the density of thread groups may vary along the longitudinal length of the first load-bearing web 128 and the second load-bearing web 130, such as by increasing or decreasing the density of the thread groups. Accordingly, the first load-bearing web 128 and the second load-bearing web 130 may separate from one another due to breaking of the binder threads 134 at an increasing or decreasing rate at a given force that exceeds the minimum predetermined force threshold. The arrangement of the thread groups may be selected to optimize the tear-away force required to break the binder threads 134 (or adhesive) during separation of the first load-bearing web 128 and the second load-bearing web 130 from each other.

With continued reference to FIGS. 2C-2D, as the energy absorbing portion 132 is deployed due to tearing of the binder threads 134, the binder threads 134 do not fracture simultaneously along the longitudinal length of the energy absorbing portion 132. Rather, the binder threads 134 are configured to break or fracture successively along the longitudinal length of the energy absorbing portion 132 from the first starting tear point 144 and the second starting tear point 146 in a direction toward the reinforced area 148. The tearing action of the binder threads 134 absorbs energy, thereby decelerating the user's fall, and reducing the shock that is transferred to the user's body due to the fall. FIG. 2D shows the first load-bearing web 128 and the second load-bearing web 130 in a state where the binder threads 134 have been completely fractured or torn apart in the energy absorbing portion 132.

As described herein, the energy absorbing portion 132 of the energy absorber 100 can be designed to have a desired activation force, i.e. a minimum predetermined force threshold required to activate and tear apart the binder threads 134 of the energy absorbing portion 132. Various features of the energy absorbing portion 132 can be varied to achieve a particular activation force. For example, various features of the energy absorbing portion 132 of the energy absorber 100, can be varied to provide a desired activation force. For example, the density and strength of the binder threads 134, weaving pattern of the binder threads 134, and/or length and width of the energy absorbing portion 132 can be selected as desired to provide the desired activation force. In some embodiments or aspects, the minimum predetermined force threshold (i.e., load) may be in the range of about 900 lbs to about 1,200 lbs. The tearing of the binder threads 134 is initiated when the force on the energy absorbing portion 132 exceeds the minimum predetermined force threshold (load). The tearing of the binder threads 134, and a consequent separation of the first load-bearing web 128 and the second load-bearing web 130 along the energy absorbing area 132 continues as long as the force on the energy absorber 100 exceeds the minimum predetermined force threshold and ends when either (1) the first load-bearing web 128 and the second load-bearing web 130 reach the reinforcement area 148; or (2) the force reduces to a point below the minimum predetermined force threshold.

As discussed above, and in another non-limiting embodiment or aspect, the first and second load-bearing webs 128, 130 may be bound together by an adhesive that separates when the energy absorber 100 is exposed to a force in excess of a minimum predetermined force threshold. The adhesive may be specifically formulated to meet the separation requirements at the minimum predetermined force threshold.

Figure 3A:
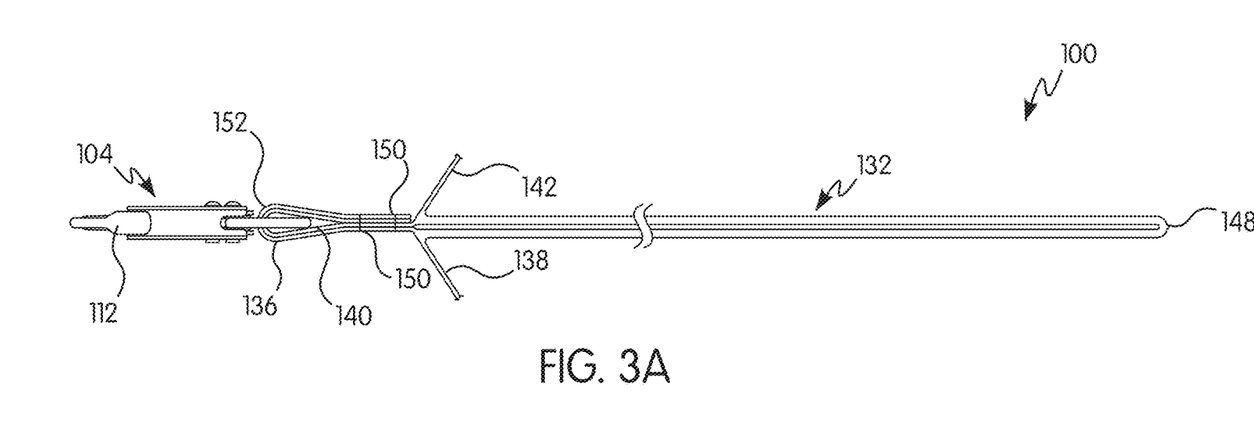
FIG. 3A is top view of the energy absorber of FIG. 1A shown in an unrolled and undeployed configuration.

With reference to FIG. 3A, the first and second load-bearing webs 128, 130 are folded in half such that the first left end 136 of the first load-bearing web 128 is connected to the first right end 138 of the first load-bearing web 128. As shown in FIG. 3A, the first left and right ends 136, 138 of the first load-bearing web 128 may be connected by looping the first left and right ends 136, 138 and stitching the looped section with threads 150 or otherwise permanently and non-removably connecting the first left and right ends 136, 138 to the first load bearing web 128. In some non-limiting embodiments or aspects, prior to connecting the first left and right ends 136, 138, a first attaching structure 112 may be inserted through the opening defined by a first loop 152 of the first left and right ends 136, 138. The first loop 152 thus defines the first end 104 of the energy absorber 100.

Figure 3B:
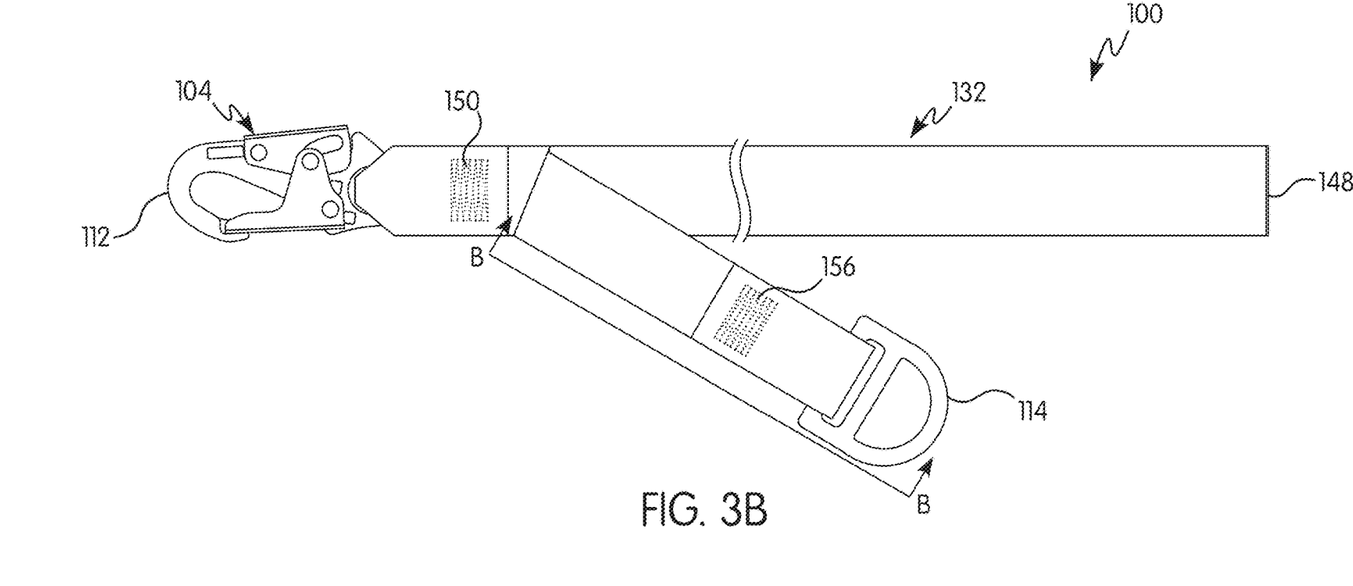
FIG. 3B is a side view of the energy absorber shown in FIG. 3A.
Figure 3C:
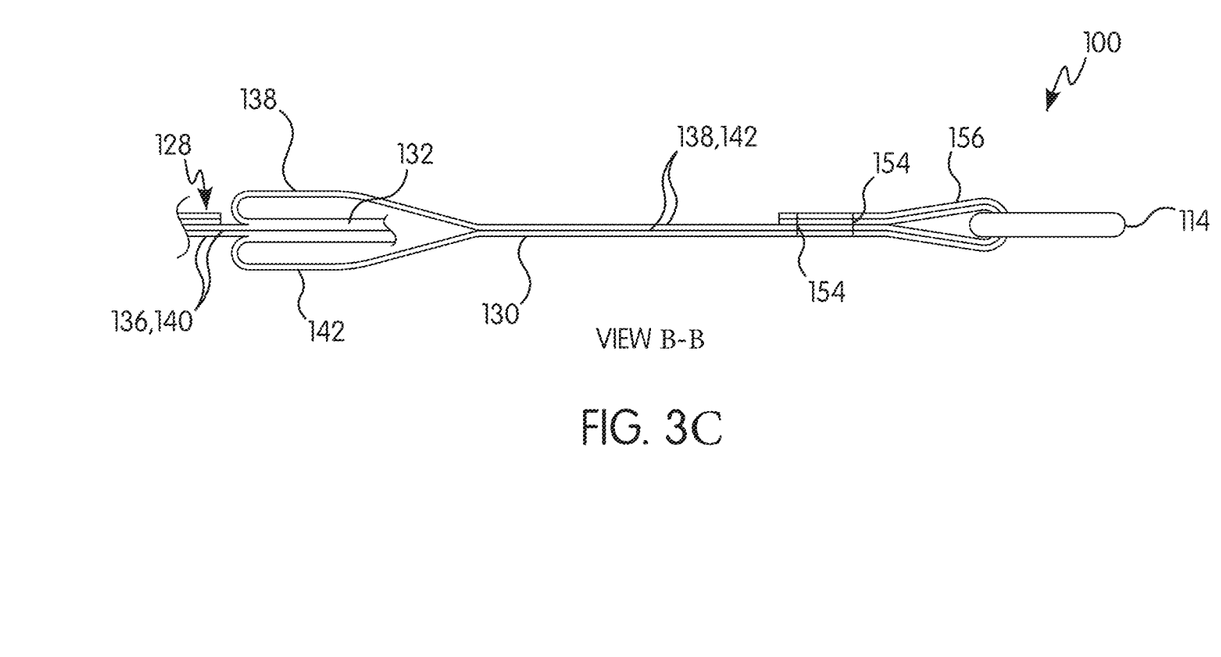
FIG. 3C is a side cross-sectional view of detail B-B shown in FIG. 3B.

With continued reference to FIG. 3A, by folding the first and second load-bearing webs 128, 130, the reinforced area 148 is positioned opposite the first end 104 (i.e., the first loop 152) of the energy absorber 100. The second left end 140 and the second right end 142 of the second load-bearing web 130 protrude away from the second starting tear point 146. As shown in FIGS. 3A-3C, the second left and right ends 140, 142 of the second load-bearing web 130 are connected together in a manner similar the first left and right ends 136, 138 of the first load-bearing web 128. For example, the second left and right ends 140, 142 of the second load-bearing web 130 may be connected by looping the second left and right ends 140, 142 and stitching the looped section with threads 154 or otherwise permanently and non-removably connecting the second left and right ends 140, 142 to the second load bearing web 130. In some non-limiting embodiments or aspects, prior to connecting the second left and right ends 140, 142, a second attaching structure 114 may be inserted through the opening defined by a second loop 156 of the second left and right ends 140, 142. The second loop 156 thus defines the second end 106 of the energy absorber 100.

As shown in FIG. 3A, the energy absorbing portion 132 of the energy absorber 100 is folded over itself when the first and second load-bearing webs 128, 130 are folded in half such that the reinforced area 148 is positioned at one end of the folded energy absorber 100. The energy absorbing portion 132 is then coiled into a spiral form beginning at the reinforced area 148 by coiling or spiraling the energy absorbing portion 132 in a direction of arrow B in FIG. 3A. The reinforced area 148 defines a central axis around which the energy absorbing portion 132 is wound in a continuous and gradually widening curve. In this manner, the longitudinal length of the energy absorbing portion 132 is substantially reduced between the unfolded configuration shown in FIG. 3A and the folded configuration shown in FIG. 1B. By reducing the longitudinal length of the energy absorbing portion 132, the energy absorber 100 is dimensionally compact such that it can be easily and effectively worn by the user in a variety of work environments without compromising the user's ability to move and without risking snagging of the energy absorber 100 on an object in the environment surrounding the user. Because the energy absorbing capability of an energy absorber is defined by a length of the energy absorbing portion, the energy absorber 100 having a coiled energy absorbing portion 132 can have a smaller size without reducing its energy absorbing ability, thereby making it more portable compared to a comparably rated conventional energy absorber having one or more longitudinal folds.

With reference to FIG. 4, the energy absorber 100 is shown in a deployed configuration, such as after a fall event where the energy absorber has been exposed to a force in excess of the minimum predetermined force threshold. The energy absorber 100 is activated due to a force in a direction of arrow C acting on the first and second ends 104, 106 of the energy absorber 100. The initial activation of the energy absorber 100 starts at the first and second starting tear points 144, 146. As shown in FIG. 1B, the first and second starting tear points 144, 146 are positioned on opposing sides of the energy absorber 100. Because the first and second ends 104, 106 of the energy absorber 100 are pulled in a direction away from one another, the tearing of the binder threads 134 in the energy absorbing area 132 allows the first and second load-bearing webs 128, 130 to unravel from the undeployed, coiled configuration shown in FIG. 1B to a deployed, uncoiled configuration shown in FIG. 4. The deployment of the energy absorber 100 stops once all of the binder threads 134 have been torn, thereby leaving the first and second load-bearing straps 128, 130 connected at the reinforced area 148. In this manner, the energy absorber 100 eliminates the need for a structural back-up strap as the first and second load-bearing straps 128, 130 maintain static strength of the structural webbing at full elongation (end of deployment shown in FIG. 4).

Figures 5A, 5B:
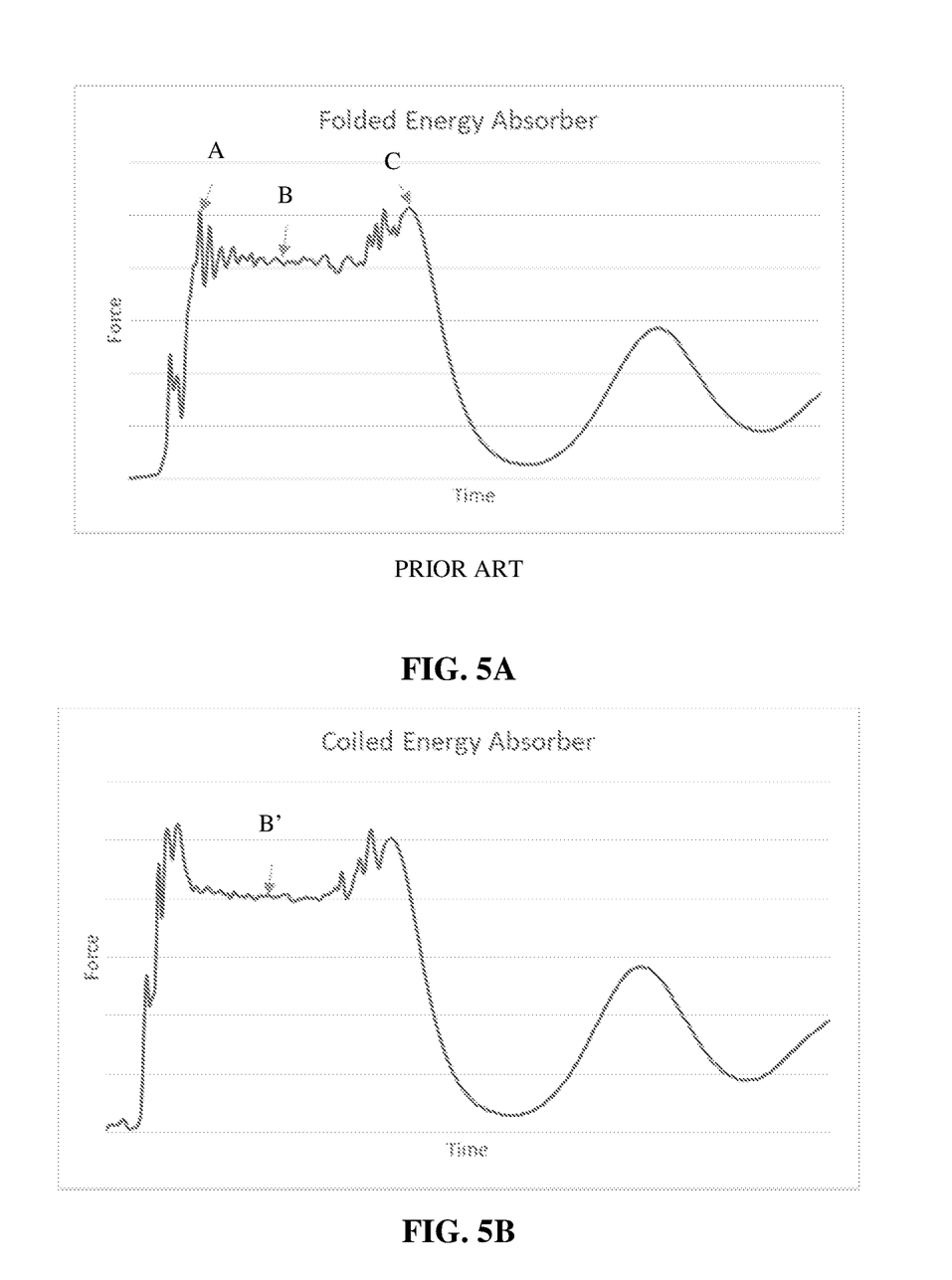
FIG. 5A is a force graph showing a deployment of a conventional energy absorber as a function of time in accordance with the prior art.
FIG. 5B is a force graph showing a deployment of an energy absorber as a function of time in accordance with the principles of the present invention.

With reference to FIGS. 5A-5B, a force graph shows a deployment of a conventional energy absorber having one or more longitudinal folds (FIG. 5A) and a coiled energy absorber 100 (FIG. 5B) as a function of time. The force graph defines a "shock profile" of the energy absorber from an initial phase of deployment to a final phase of deployment. As shown in FIG. 5A, during a deployment of a conventional energy absorber outlined in the dashed box, a peak force A in the shock profile occurs during an initial deployment of the energy absorber, such as during an initial tearing of the binder threads of the tear tape material. As deployment ends, a final increase in force occurs at C. The B deployment phase is characterized by the deployment force between the initial peak A and the final peak C. A series of abrupt changes or jolts in force magnitude occur in the B phase of deployment.

With reference to FIG. 5B, such abrupt force changes are eliminated with the coiled energy absorber 100 of the present invention, indicating a smoother and more consistent deployment force during the B' phase of a fall event. The abrupt changes or jolts in force magnitude associated with prior art energy absorbers are substantially reduced with the coiled energy absorber 100.

Although the invention has been described in detail for the purpose of illustration based on what are currently considered to be the most practical and preferred embodiments or aspects, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. An energy absorber for a safety harness, the energy absorber comprising:
    a first end, a second end, and an energy absorbing portion between the first end and the second end,
    wherein the energy absorbing portion has a first load-bearing web integrally bound to a second load-bearing web,
    wherein the energy absorbing portion has a first starting tear point proximal to the first end, a second starting tear point proximal to the second end, and a reinforced area between the first starting tear point and the second starting tear point,
    wherein the energy absorbing portion is coiled in a spiral shape in an undeployed configuration, and
    wherein the energy absorbing portion is deployable from the undeployed configuration to a deployed configuration when the first end is pulled away from the second end due to a force exceeding a minimum predetermined force threshold such that at least a portion of the first load-bearing web tears away from at least a portion of the second load-bearing web.

2. The energy absorber of claim 1, wherein the first load-bearing web and the second load-bearing web are integrally bound in the energy absorbing portion by a plurality of binder threads.

3. The energy absorber of claim 1, wherein the minimum predetermined force threshold is in the range of about 900 lbs to about 1,200 lbs.

4. The energy absorber of claim 1, wherein, during deployment, the first load-bearing web successively tears away from the second load-bearing web in a direction from the first starting tear point toward the reinforced area and in a direction from the second starting tear point toward the reinforced area.

5. The energy absorber of claim 4, wherein the reinforced area prevents separation of the first load-bearing web from the second load-bearing web.

6. The energy absorber of claim 1, wherein the first load-bearing web has a first left end and a first right end, and wherein the first left end and the first right end are joined together to define the first end of the energy absorber.

7. The energy absorber of claim 6, wherein the first left end and the first right end form a first loop.

8. The energy absorber of claim 1, wherein the second load-bearing web has a second left end and a second right end, and wherein the second left end and the second right end are joined together to define the second end of the energy absorber.

9. The energy absorber of claim 8, wherein the second left end and the second right end form a second loop.

10. The energy absorber of claim 1, further comprising a casing at least partially enveloping the energy absorbing portion.

11. The energy absorber of claim 10, wherein the casing comprises a first opening through which the first load-bearing web extends out of the casing and a second opening through which the second load-bearing web extends out of the casing.

12. The energy absorber of claim 1, further comprising a first attaching structure connected to the first end.

13. The energy absorber of claim 12, wherein the first attaching structure is a D-ring, a carabiner, or a snap hook.

14. The energy absorber of claim 1, further comprising a second attaching structure connected to the second end.

15. The energy absorber of claim 14, wherein the second attaching structure is a D-ring, a carabiner, or a snap hook.

16. An energy absorber for a safety harness, the energy absorber comprising:
    a first end, a second end, and an energy absorbing portion between the first end and the second end; and
    a casing at least partially enveloping the energy absorbing portion,
    wherein the energy absorbing portion has a first load-bearing web integrally bound to a second load-bearing web by a plurality of binder threads,
    wherein the first load-bearing web has a first left end and a first right end, and wherein the first left end and the first right end are joined together to define the first end of the energy absorber, and wherein the second load-bearing web has a second left end and a second right end, and wherein the second left end and the second right end are joined together to define the second end of the energy absorber,
    wherein the energy absorbing portion has a first starting tear point proximal to the first end, a second starting tear point proximal to the second end, and a reinforced area between the first starting tear point and the second starting tear point,
    wherein the energy absorbing portion is coiled in a spiral shape in an undeployed configuration, and
    wherein the energy absorbing portion is deployable from the undeployed configuration to a deployed configuration when the first end is pulled away from the second end due to a force exceeding a minimum predetermined force threshold such that at least a portion of the first load-bearing web tears away from at least a portion of the second load-bearing web.

17. The energy absorber of claim 16, wherein the casing comprises a first opening through which the first load-bearing web extends out of the casing and a second opening through which the second load-bearing web extends out of the casing.

18. The energy absorber of claim 16, wherein, during deployment, the first load-bearing web successively tears away from the second load-bearing web in a direction from the first starting tear point toward the reinforced area and in a direction from the second starting tear point toward the reinforced area.

* * * * *

UNITED STATES PATENT AND TRADEMARK OFFICE
CERTIFICATE OF CORRECTION

PATENT NO. : 10,874,886 B2
APPLICATION NO. : 16/046420
DATED : December 29, 2020
INVENTOR(S) : Loryn Ashley Bertoti et al.

It is certified that error appears in the above-identified patent and that said Letters Patent is hereby corrected as shown below:

In the Claims

Column 13, Line 61, Claim 5, delete "claim 4," and insert -- claim 1, --

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*